United States Patent [19]

Halter et al.

[11] Patent Number: 4,464,319
[45] Date of Patent: Aug. 7, 1984

[54] METHOD OF AND APPARATUS FOR THE COILING OF FLATTENED SYNTHETIC RESIN FOIL TUBES

[75] Inventors: Hartmut Halter, Ruppichteroth; Willi Schnell, Cologne, both of Fed. Rep. of Germany

[73] Assignee: Reifenhäuser GmbH & Co. Maschinenfabrik, Troisdorf, Fed. Rep. of Germany

[21] Appl. No.: 405,605

[22] Filed: Aug. 5, 1982

[51] Int. Cl.³ .............................................. B29D 23/04
[52] U.S. Cl. .................................... 264/40.1; 156/229;
156/244.14; 264/40.7; 264/564; 264/209.2;
425/140; 425/150; 425/326.1
[58] Field of Search ............. 264/564, 514, 503, 40.7,
264/40.1, 40.4, 40.5, 209.2; 425/326.1, 140, 150;
156/244.14, 229

[56] References Cited

U.S. PATENT DOCUMENTS

| | | | |
|---|---|---|---|
| 3,368,007 | 2/1968 | Palmer | 264/564 |
| 3,396,219 | 8/1968 | Sutterfield et al. | 264/40.7 |
| 3,474,160 | 10/1969 | Doering | 425/326.1 |
| 3,726,743 | 4/1973 | Reifenhauser et al. | 264/515 |
| 3,737,495 | 6/1973 | Nagano et al. | 264/564 |
| 3,926,706 | 12/1975 | Reifenhauser et al. | 425/133.1 |
| 3,957,566 | 5/1976 | Rahlfs | 425/133.1 |
| 3,989,785 | 11/1976 | Bridge | 425/326.1 |
| 4,112,034 | 4/1978 | Nash et al. | 425/326.1 |
| 4,189,288 | 2/1980 | Halter | 425/140 |
| 4,246,212 | 1/1981 | Upmeier et al. | 425/140 |
| 4,294,791 | 10/1981 | Nouda et al. | 264/40.7 |

FOREIGN PATENT DOCUMENTS

| | | | |
|---|---|---|---|
| 2721609 | 11/1978 | Fed. Rep. of Germany | 425/140 |
| 1110003 | 4/1968 | United Kingdom | 425/326.1 |

*Primary Examiner*—Jeffery R. Thurlow
*Attorney, Agent, or Firm*—Karl F. Ross; Herbert Dubno

[57] ABSTRACT

A method of and apparatus for the formation of synthetic resin foil coils. The angular velocity of the flaw propagating member is reduced as the coil increases for at least a multiplicity of turns to impart to the coil the configuration of a right circular cylinder with a high degree of precision.

5 Claims, 6 Drawing Figures

METHOD OF AND APPARATUS FOR THE COILING OF FLATTENED SYNTHETIC RESIN FOIL TUBES

FIELD OF THE INVENTION

Our present invention relates to the production of synthetic resin foils and, more particularly, to the blowing of synthetic resin foils and the coiling thereof. Specifically the invention relates to a method of and apparatus for the coiling of flattened blown tubes of synthetic resin materials.

BACKGROUND OF THE INVENTION

In the formation of synthetic resin foils or films, the extruded thermoplastic tube is blown to decrease the wall thickness and transform the extruded strand into a tube of a foil or film thickness, this tube being flattened to produce a two-layer web or, where a number of tubes are formed one within another, a multi-layer web. (See, for example, the commonly assigned U.S. Pat. Nos. 3,726,743, 3,926,706 and 3,957,566).

Generally, the film or foil blowing machine is also provided with a coiling unit on which the flattened web is coiled for storage of the foil, for subsequent handling, etc.

The coils can then be delivered to, for example, a machine for making bags, to devices for printing or cutting the web, or to packaging apparatuses in which the web is utilized to envelop an article to be packaged.

In general, the head at which the extruded strand of the thermoplastic material emerges to be blown to form the foil tube can be considered to be a flaw-producing member since thickness flaws frequently develop at the point of emergence from this member and can be propagated over the length of the blown tube.

The tube is blown at a substantially constant rate and hence the flattened foil web, consisting of at least two layers for the reasons described, emerges at a substantially constant rate from the foil blowing apparatus and is delivered to the coiling device.

So that any thickness defect may not be concentrated at a single point along the coil or along the web, the member at which the foil tube emerges from the blowing head is generally rotated or angularly oscillated so that any thickness defect will generally be laid down in a more or less periodic pattern. The pattern is determined by the angular velocity of this member. When the web is coiled, the defect pattern lies along an arc whose radius is a function of the product of the angular velocity of the member, the radius of this member and the coiling time for the particular layer.

The web, which can be flattened from the tube, can have at least two layers which can be connected along opposite longitudinal edges of the flattened tube or only along one edge if, for example, the tube is longitudinally slit.

The angularly displaceable member, which determines the point at which the thickness defect may be produced in the foil tube, can be the injection head for the extrusion of the thermoplastic tube, a ring against which this tube expands or a like member (see Schenkel, *Kunststoff-Extrudertechnik,* Muinch, 1963, pages 390–393) or other means for laying down the foil including bars or the like to which a similar periodic movement is imparted.

In spite of the fact that an angular displacement is important to the member to prevent concentration of thickness defects in a single longitudinal zone of the web or the tube, problems are encountered in the prior art devices. For example, it is common to maintain this angular velocity substantially constant and at a speed chosen to permit the flattening of the foil tube in such manner that it is free from folds.

It is customary to operate at the highest possible angular velocity which will not result in the formation of folds.

This system largely prevents thickness defects from being additive or cumulative on coiling and prevents the formation of bulges or ridges in one circular zone of the coil.

However, in practice it is found that the arc over which any defect is laid don in the coil increases in radius from layer to layer and, while a severe bulge at one location may not result, there is nevertheless a tendency for the coil to depart from a cylindrical configuration and assume a conical or other distorted configuration, i.e. the configuration of a one-sheet hyperboloid of revolution.

Such noncylindrical coils are difficult to handle in subsequent processing machinery, for example, bag manufacturing machines. The problem is especially pronounced when tools or guide members must back directly against the coil or in a system in which the periphery of the coil determines other operating parameters of the machine.

OBJECTS OF THE INVENTION

It is the principal object of the present invention to provide a method of operating a foil blowing and coiling apparatus to obviate the aforementioned disadvantages and, as nearly as possible, eliminate deviations from a right circular cylindrical configuration of the resulting coil.

Another object of this invention is to provide an apparatus for the blowing and coiling of thermoplastic foil, whereby the disadvantages of earlier systems are obviated and the coil which results can be more readily utilized in bag-making and like machinery.

Still another object of the invention is to provide an improved method of and apparatus for the coiling of flattened tubular webs and synthetic resin material so that the resulting coil has a form closer to that of a right circular cylinder than has hitherto been the case.

SUMMARY OF THE INVENTION

We have now discovered that the problem presented above can be resolved by varying the angular velocity of the aforementioned member at which the propagatable thickness defect emerges in accordance with certain parameters to be detailed below, the result being the coiling of the web in spite of the presence of such defects with a high degree of proximity to a right circular cylindrical form. One of the reasons why the invention is so surprising is that generally the angular velocity of this member is not considered to be adjustable at all and is not adjusted during a single coiling operation.

More specifically, the invention results in reducing the angular velocity of the aforementioned member with increase in the layer coiling time, i.e. as the coil is built up and successive layers are deposited on a coil of greater diameter, and maintaining the flaw pattern arc substantially constant for a multiplicity of layers.

The term "layers" as applied to the coil is, of course, intended to refer to the turns of the web on the coil.

The invention is based upon the fact that the thickness-flaw deposition patterned in the coiled layer or the layer to be coiled should be the same, at least with respect to the spread across the coil, regardless of the build-up of layers thereon when the coil shape is not to deviate from a cylindrical configuration. Thus, the flaw pattern for the first layer should be the same as the flaw pattern arc for the subsequent layers and even the $n^{th}$ layer where n is a large number. The increase in the diameter of the coil by the addition of subsequent layers results in offsetting of this pattern from layer to layer and the pattern, if it is additive, adds only over the width of the coil. In practice, the coil is found to have a cylindrical configuration with only the slightest deviation from a right circular cylindrical form.

If the angular velocity of the member for the $n^{th}$ foil layer is represented by $\omega_n$, the coiling time for the $n^{th}$ foil layer by $\Delta t_n$ and the laying radius by r, the product $\omega_n \cdot \Delta t_n \cdot r$ should be constant for at least a multiplicity of values of successive n's and over at least this multiplicity of turns, $\omega_n$ should decrease as $\Delta t_n$ increases. $\Delta t_n$ is, of course, the time required to deposit one layer of the web, i.e. one turn, on the coil.

This can be achieved by utilizing the same product for all of the layers of the coil, i.e. the product is valid for all values of n ranging between 1 and the maximum number of turns to be formed on the coil.

When large diameter coils are formed, however, it is advantageous to hold the product constant until the angular velocity $\omega$ has been reduced to half ($\omega/2$) to one third ($\omega/3$) of its original value and thereafter to increase its value to the starting level again, thereby forming a new product which is maintained for the next multiplicity of turns until the angular velocity again is diminished in the same manner. The product thus increases in steps.

In thick coils, therefore, an outer zone will have a uniform distribution of thickness flaws although the distribution may differ from that of an inner layer. This also is the result when, in accordance with a feature of the invention, after a period of movement of the member, the angular velocity is switched back.

In its apparatus aspects, the invention provides an angularly displaceable member of the type desribed, a drive for this member and a control device which, in response to the size of the coil, reduces the angular velocity of the member.

According to a feature of the invention, the coiling station can be provided with a pulse generator which produces a control pulse or pulse train representing the coil diameter or number of layers thereof and triggering a reduction in the angular velocity of the member. The control system of course maintains the aforementioned product substantially constant at least for a multiplicity of turns.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
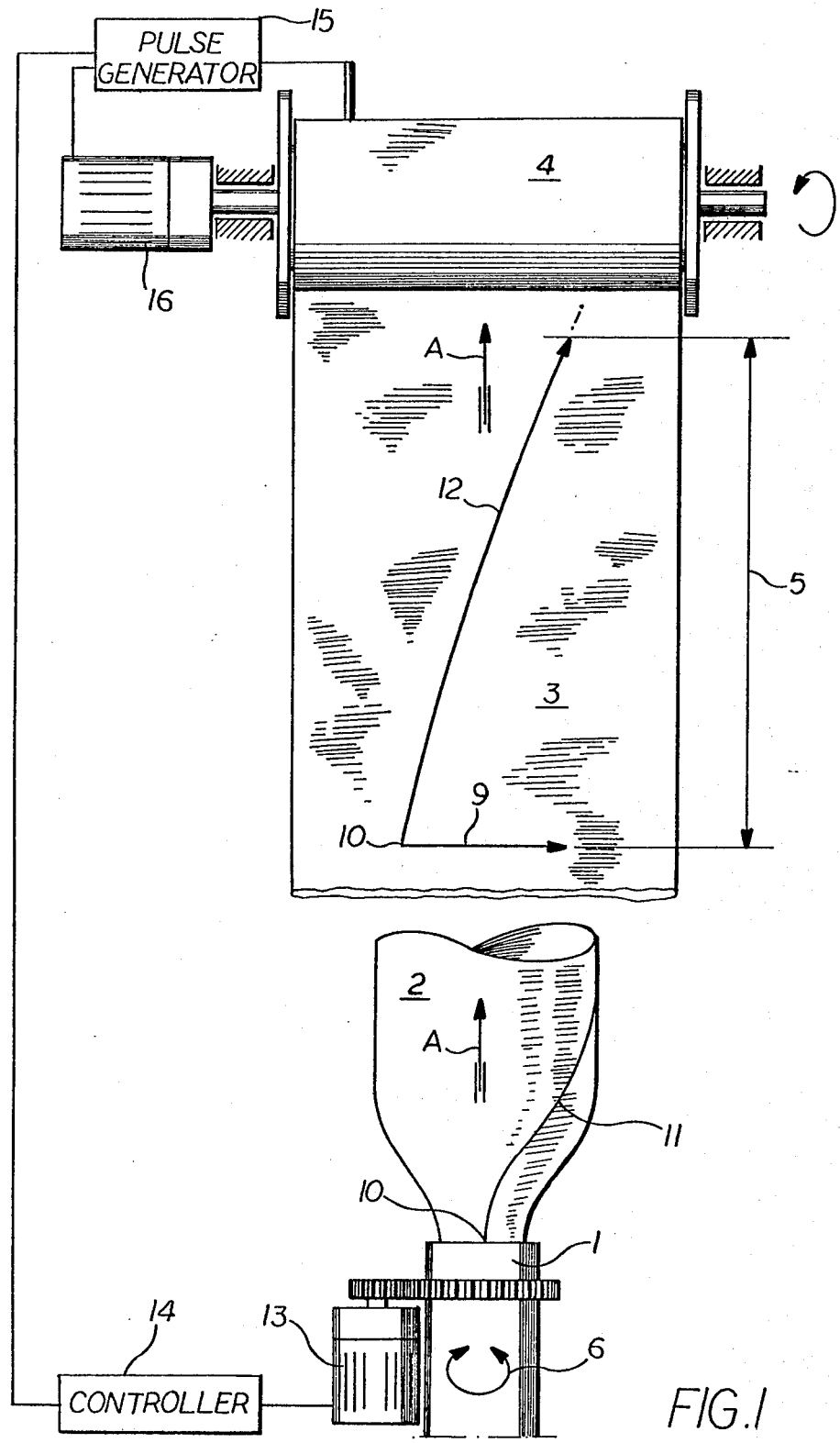
FIG. 1 is a diagrammatic elevational view of an apparatus in accordance with the invention.

FIG. 1 shows a so-called blowing head 1 of a foil blowing apparatus connected to an extruder, not shown, and adapted to produce a tube 2 of the foil which is flattened in the manner described in the aforementioned patents to a foil web 3 here shown as a double-thickness foil. This web 3 is wound up in a coil 4 in successive layers, i.e. n layers.

Because of the increase in the diameter of the coil with each layer, the coiling duration for each layer increases and can be represented at $\Delta t_n$.

As shown by the double-headed arrow 5, a specific coil layer can have a length which can be laid out along the web. The web 3 moves at a constant rate from the foil blowing unit.

To ensure that there is no concentration of a thickness flaw at any particular point along the length of the coil, the foil web is subjected to a periodic flaw distribution. In the embodiment illustrated, this is achieved by angularly oscillating the head 1 as represented by the arrow 6 so that any flaw formed at a point 10 on this member describes the arcuate pattern 11 as the foil moves in the direction of the arrow A.

Figure 2A:
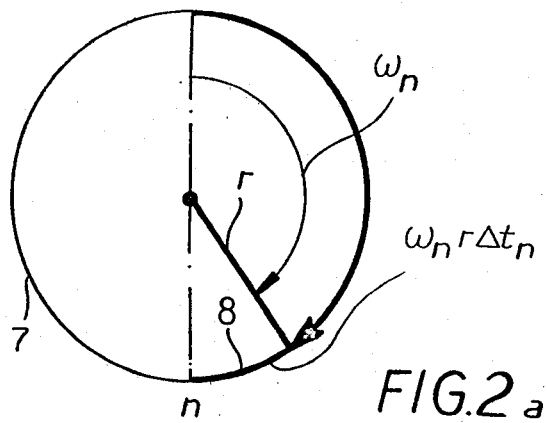
FIGS. 2a, 2b and 2c are views showing the movement of the flaw-propagating member for different foil layers as vector diagrams.
Figure 2B:
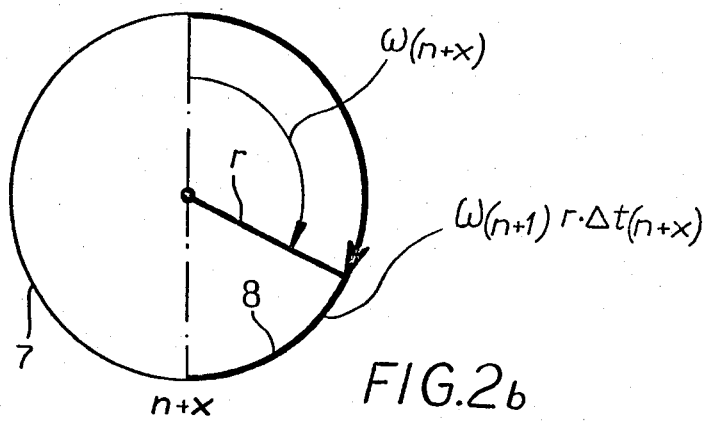
Figure 2C:
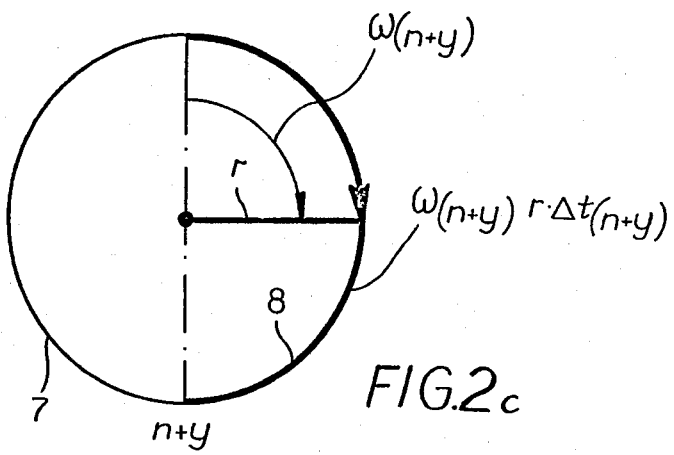

This may be seen more clearly from FIGS. 2a, 2b and 2c. In these vector diagrams, the flaw, at a radius r from its axis is angularly displaced by a velocity $\omega_n$ while the layer is deposited over an interval $\Delta t_n$ on the coil. Thus a product $\omega_n \cdot r \cdot \Delta t_n$ is definable which is represented by an arc segment on the deposition circle 7.

The flaw is then swept by this angular displacement through the distance 9 as the layer moves through the distance 5. The pattern of the flow is thus represented by the curve 11 on the tube and the curve 12 on the web. The angular displacement of the flaw is proportional to the arc segment 8 and to the product $\omega_n \cdot r \cdot \Delta t_n$.

In FIG. 2a the circle 7 can represent the gap at the mouth of the blowing head 1. FIG. 2b shows the relationship for the $(n+x)^{th}$ layer. Here the angular velocity $\omega_{(n+x)}$ is reduced as $\Delta t_{(n+x)}$ is increased so that the product remains the same. The same is true for the $(n+y)^{th}$ foil layer (See FIG. 2c).

Figure 3:
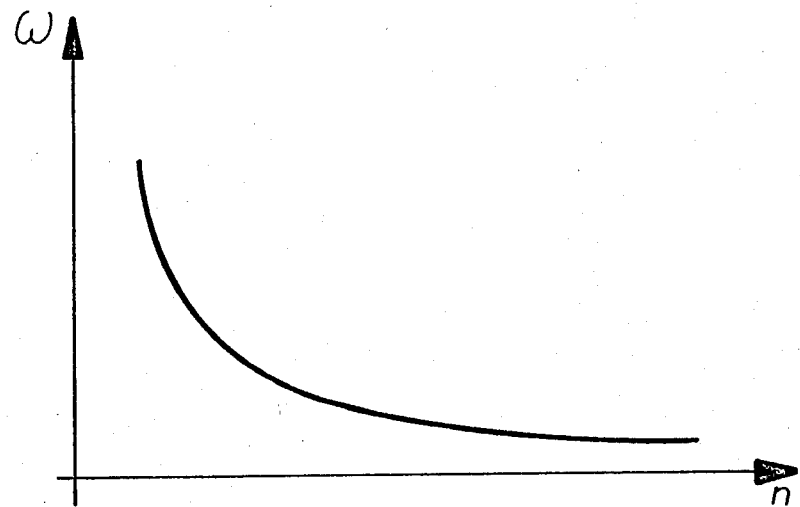
FIG. 3 is a graph in which the angular velocity of the member is plotted as a function of the number of turns of the coil.

From FIG. 3 it can be seen that the value of $\omega$, plotted along the ordinate, becomes smaller with increasing n plotted along the abscissa and thus that the angular velocity is inversely proportional to the number of layers of the coil and hence the diameter of the coil, the number n representing a count which can be stored, for example, in a counter. The product $\omega_n \cdot r \cdot \Delta t_n$ is maintained constant for all of the foil layers of the coil in this embodiment.

Figure 4:
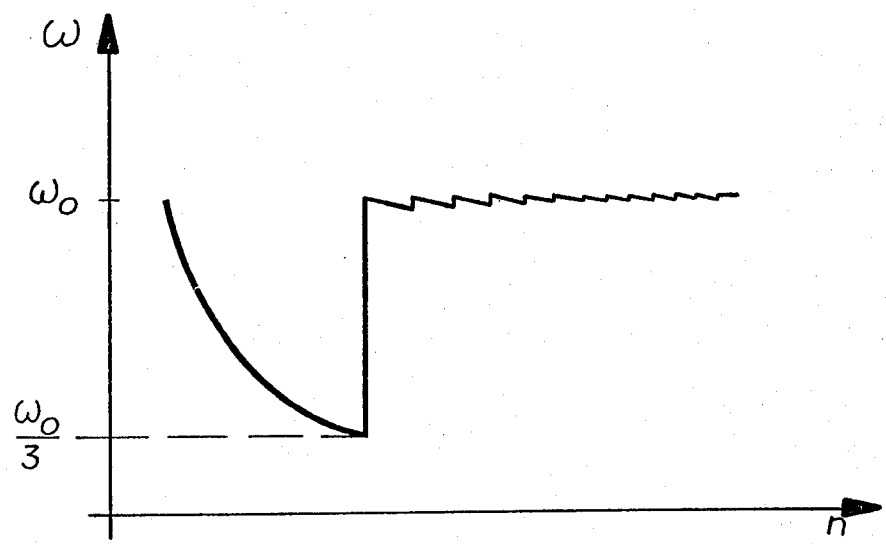
FIG. 4 is another graph illustrating an embodiment of the invention and representing a similar plot.

In the embodiment of FIG. 4, however, the product is maintained constant only for the first group of layers, i.e. until the value of $\omega$ has dropped to about one third of its original value, whereupon the value of $\omega$ is restored and the value of $\omega$ is returned to its original value after every few further turns.

The head 1 can be provided with a drive 13 for angularly oscillating the head at a rate determined by a controller 14 which responds to a pulse generator 15 connected to the motor 16 drawing a coil and providing an output to the controller 14 representing the increase in diameter of the coil. The controller 14 simply maintains the aforementioned product constant.

We claim:

1. In a method of operating a foil blowing and coiling apparatus comprising:
    a foil blowing head adapted to blow a tube of a synthetic resin material to produce the foil in the form of said tube, said tube being flattened into a web, and
    a coiling device receiving said web at a constant rate and coiling same in a multiplicity of turns with the turns being coiled in layers with increasing coiling time for successive layers, said head being formed with a periodically displaceable member adapted to sweep any thickness defect at an angular velocity around the foil tube as it is formed so that said thickness defect will form an arc pattern on said web spread across the latter, the improvement wherein said method comprises the step of:
    reducing the angular velocity of said member with increase of the number of turns of said web on said coil to maintain the product of the angular velocity of said member, the radius at which said flaw is formed on said tube and the time required to form a turn of said web on said coil substantially constant for a multiplicity of successive turns so that said arc pattern is maintained constant for said multiplicity of successive turns.

2. The improvement as defined in claim 1 wherein said product is maintained substantially constant for all of the turns of said coil.

3. The improvement as defined in claim 1 wherein said product is maintained substantially constant until said angular velocity has been reduced to substantially one half to one third of its original value and then said angular velocity is restored to its original value thereby establishing a new product for subsequent turns.

4. The improvement as defined in claim 3 wherein after establishment of said new product, said original angular velocity is restored periodically as additional turns are accumulated on said coil.

5. In an apparatus for the production of a coil of synthetic resin foil material comprising a blowing head for blowing a tube of synthetic resin foil material and including an angularly displaceable member for sweeping any thickness flaw angularly about said tube at an angular velocity and with a radius, said tube being flattened into a web, and means for coiling said web in a multiplicity of turns with progressively increasing coiling times, the improvement which comprises:
    means responsive to the increase in the number of turns on said coil for reducing said angular velocity to maintain the product of said angular velocity, said radius and the coiling time substantially constant for a multiplicity of turns.

* * * * *